United States Patent
Shoham

(10) Patent No.: US 8,442,677 B2
(45) Date of Patent: May 14, 2013

(54) VERIFICATION SYSTEM FOR ROBOT POSE

(75) Inventor: Moshe Shoham, Hoshaya (IL)

(73) Assignee: Mazor Surgical Technologies, Ltd., Caesarea (IL)

( * ) Notice: Subject to any disclaimer, the term of this patent is extended or adjusted under 35 U.S.C. 154(b) by 1032 days.

(21) Appl. No.: 10/597,673

(22) PCT Filed: Feb. 3, 2005

(86) PCT No.: PCT/IL2005/000132
§ 371 (c)(1),
(2), (4) Date: Aug. 13, 2008

(87) PCT Pub. No.: WO2005/074368
PCT Pub. Date: Aug. 18, 2005

(65) Prior Publication Data
US 2008/0294285 A1 Nov. 27, 2008

Related U.S. Application Data

(60) Provisional application No. 60/541,256, filed on Feb. 4, 2004.

(51) Int. Cl.
*G06F 19/00* (2011.01)
(52) U.S. Cl.
USPC ........... 700/245; 700/250; 700/253; 700/254; 700/262
(58) Field of Classification Search .................... None
See application file for complete search history.

(56) References Cited

U.S. PATENT DOCUMENTS

| | | | | |
|---|---|---|---|---|
| 5,382,885 A | * | 1/1995 | Salcudean et al. | 318/568.11 |
| 5,715,729 A | * | 2/1998 | Toyama et al. | 74/490.03 |
| 5,847,528 A | * | 12/1998 | Hui et al. | 318/568.1 |

(Continued)

FOREIGN PATENT DOCUMENTS

| | | | |
|---|---|---|---|
| EP | 0834383 A1 | | 4/1998 |
| GB | 2144711 A | * | 3/1985 |
| GB | 2311149 A | | 9/1997 |
| WO | 01/19272 | | 3/2001 |
| WO | 0198023 A1 | | 12/2001 |

OTHER PUBLICATIONS

Parenti-Castelli V. et al.; Determination of the actual configuration of the general Stewart platform using only one additional displacement sensor Proceedings of the 1995 ASME International Mechanical Engineering Congress & Exposition; San Francisco, CA, USA—Nov. 12-17, 1995, XP009102563.

(Continued)

*Primary Examiner* — Bhavesh V Amin
(74) *Attorney, Agent, or Firm* — Fish & Richardson P.C.

(57) ABSTRACT

An apparatus and method for assuring effective backup for sensor failure in robots, by utilizing a single extra sensor attached between the end actuator and the base. The single extra sensor provides absolute back-up for any single encoder failure that may occur in the system, and statistically significant back-up for any double encoder failure. A single additional sensor effectively provides the robotic system with one redundant information input to the robot control algorithm, which can be used in order to determine whether any of the other control sensors, or even the additional sensor itself, has failed and is delivering an erroneous reading, and hence to warn the operator of the failure. A single additional sensor also provides useful warning of the simultaneous failure of two sensors, since the likelihood that two sensors fail simultaneously in a mode that makes the failures undetectable, can be regarded as statistically insignificant.

24 Claims, 3 Drawing Sheets

U.S. PATENT DOCUMENTS

| | | | |
|---|---|---|---|
| 5,870,834 A * | 2/1999 | Sheldon | 33/556 |
| 5,909,939 A * | 6/1999 | Fugmann | 33/503 |
| 5,987,726 A * | 11/1999 | Akeel | 29/407.08 |
| 6,021,579 A * | 2/2000 | Schimmels et al. | 33/645 |
| 6,047,610 A * | 4/2000 | Stocco et al. | 74/479.01 |
| 6,327,026 B1 * | 12/2001 | Wakui | 355/72 |
| 6,418,811 B1 * | 7/2002 | Rosheim | 74/490.06 |
| 6,476,574 B1 * | 11/2002 | Nilsson et al. | 318/568.11 |
| 6,557,432 B2 * | 5/2003 | Rosheim | 74/490.05 |
| 6,648,583 B1 | 11/2003 | Roy et al. | |
| 6,837,892 B2 * | 1/2005 | Shoham | 606/130 |
| 7,040,033 B2 * | 5/2006 | Zhu et al. | 33/502 |
| 2002/0038118 A1 | 3/2002 | Shoham | 606/1 |
| 2003/0121351 A1 * | 7/2003 | Gosselin et al. | 74/490.05 |
| 2003/0223078 A1 | 12/2003 | Doren et al. | |
| 2004/0103738 A1 * | 6/2004 | Gao et al. | 74/490.01 |
| 2005/0021177 A1 * | 1/2005 | Bacchi et al. | 700/245 |

OTHER PUBLICATIONS

Brennemann A E et al., "Robot Position and Orientation Sensor" IBM Technical Disclosure Bulletin, IBM Corp., New Yor, US, vol. 26, No. 9, Feb. 1, 1984, pp. 4457-4462, XP002033467 ISSN: 0018-8689.

Parenti-Castelli et al., "Closed-Form Solution of the Direct Kinematics of the 6-3 Type Stewart Platform Using One Extra Sensor," Kulwer Acedemic Publishers (1996).

J-P. Merlet, "Singular configurations of parallel manipulators and Grassmann geometry", Int. J. of Robotics Research, vol. 8, No. 5, pp. 45-56 (1989).

J-P. Merlet, "Determination of the presence of singularities in a workspace volume of a parallel manipulator," NATO-ASI, Computational methods in mechanism.

C. Gosselin et al., "Singularity analysis of closed-loop kinematic chains", IEEE Transactions on Robotics and Automation, vol. 6, No. 3 (1990).

R. Ben-Horin, "Design Parameters of Parallel Manipulators," The Technion, Israel (1998).

H. Bamberger et al., "Kinematic structure of a parallel robot for MEMS fabrication," Advances in Robot Kinematics, ARK, Italy (2004).

H. Bamberger et al. "A new configuration of a six degree-of-freedom parallel robot for MEMS fabrication," IEEE International Conference on Robotics and Automation (2004).

* cited by examiner

FIG. 1
(Prior Art)
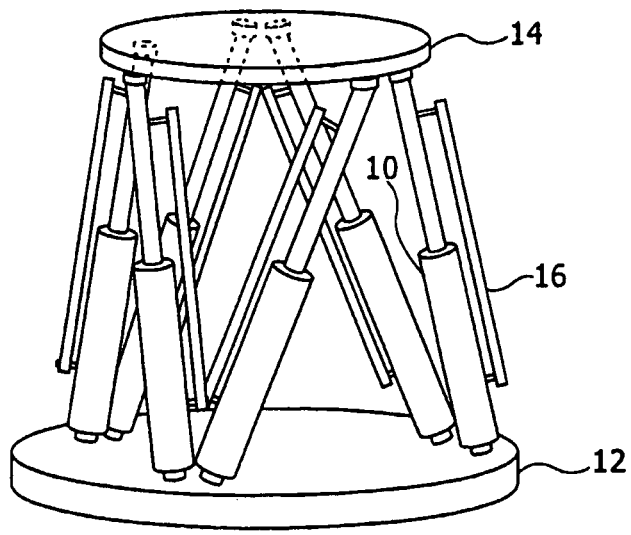
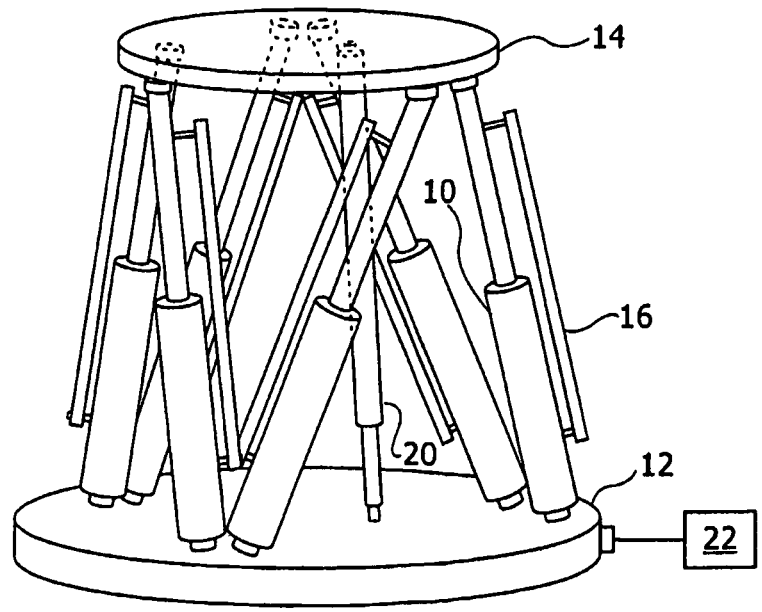
FIG. 2

VERIFICATION SYSTEM FOR ROBOT POSE

CROSS REFERENCE TO PRIOR APPLICATION

The above referenced application is a National Phase of International Patent Application No. PCT/IL2005/000132, filed Feb. 3, 2005, which claims priority from U.S. Provisional Application No. 60/541,256, filed Feb. 4, 2004. The International Application was published in English on Aug. 18, 2005 as WO 2005/074368 A2.

FIELD OF THE INVENTION

The present invention relates to the field of verifying the reliability of the controlled end effector pose in robots, especially with regard to the minimal back-up configuration required to assure a statistically acceptable level of reliability of the robot pose.

BACKGROUND OF THE INVENTION

Robotic systems have been recently entered the medical arena for enhancing the surgeons' ability to precisely and minimally invasively position surgical tools. In particular, they have been used for remote manipulation (e.g. the daVinci® system supplied by Intuitive Surgical Inc., of Sunnyvale, Calif.), as semi active devices for brain biopsies applications (the NeuroMate™ system, supplied by Integrated Surgical Systems Inc., of Davis, Calif.) and as an active robot for hip and knee replacement (e.g. the ROBODOC® system, supplied by Integrated Surgical Systems Inc., of Davis, Calif.).

Failure of a positional control component could have serious repercussions in such hazardous tasks. In order to increase system reliability, prior art surgical robots have often been equipped with a double set of encoders or position sensors, these being the components that measure joint motions and provide the inputs for the control algorithms that determine the surgical tool position and orientation, i.e. the robot pose, and hence the motion path. The double set of sensors serve as a backup in case of an encoder failure. A discrepancy between the reading on the control encoder and its parallel back-up encoder immediately points to the failed sensor.

In serial type robots, where the links and joints are connected in series, each joint actuator affects the end-effector location serially and there is generally no internal position sensor that measures the end-effector location. Hence each encoder needs to be backed up by a second encoder on the same axis.

In a parallel type robot, on the other hand, and also in hybrid parallel-serial robots, it is possible to directly measure the end-effector location relative to the base and hence to locate a second set of back-up sensors not necessarily at the joints themselves but rather between the base and the output end-effector.

In the PCT application entitled "Precision Robot with Parallel Kinematics and a Redundant Sensor System" to M. Wapler, published as International Publication No. WO 01/19272, it is suggested that for a parallel robot with six degrees of freedom, it is possible to provide an acceptably safe backup for sensor failure using a minimum of three additional sensors disposed between the base and the moving platform.

However, since the cost of each position sensor and its associated control circuitry, is not insignificant, and even more importantly, since the space available in such miniature robots is at a premium, it would be desirable to devise a simpler method of providing back-up information for such robots, yet still providing an adequate safety margin.

The disclosures of each of the publications mentioned in this section and in other sections of the specification, are hereby incorporated by reference, each in its entirety.

SUMMARY OF THE INVENTION

The present invention seeks to provide a new apparatus and method for assuring effective backup for sensor failure in robots, by utilizing only a single extra sensor attached between the end actuator and the base. The use of such a single extra sensor provides effective back up that may be considered statistically significant for common applications, for any sensor/encoder failure occurring anywhere in the system, whether in one of the sensors associated with the actuating links or hinges of the robot, or in the extra sensor itself.

The use of a single additional sensor effectively provides the robotic system with one redundant information input to the robot control algorithm, which can be used in order to determine whether any of the other control sensors, or even the additional sensor itself, has failed and is delivering an erroneous reading, and hence to warn the operator of the failure. Furthermore, the use of a single additional sensor is able to provide useful warning of the simultaneous failure of two sensors or more, given that the likelihood that two sensors or more fail simultaneously in a mode that makes the failures undetectable, is so small that it can be regarded as statistically insignificant, and hence, within the safety requirements of such robots, even for use in surgical procedures. The method and apparatus of the present invention may be applied for use in robots having any number of degrees of freedom, and the additional sensor generally provides one redundant measurement over and above that provided by the number of sensors necessary for the degrees of freedom of the particular robot. Furthermore, the sensors utilized in the present invention, whether for determining the status of the actuating links or hinges of the robot, or whether the additional sensor itself, may be either length sensors, or angular sensors, or a combination thereof. If a length sensor, then the status of the actuator link determined is its length; if an angular sensor, then the status determined is the angular orientation of the associated link or hinge.

Throughout the present application, the terms encoder and sensor are often used interchangeably, even though more formally, the sensor is any device used to ascertain a link length or a joint angle, and an encoder is a device for providing a digital output signal according to the length or angle detected by the device. However, it is to be understood that when these different terms are used in this application, it is generally for the convenience of functional differentiation, and that the terms are understood to be equivalent and interchangeable in practice, and are thuswise claimed.

There is thus provided in accordance with a preferred embodiment of the present invention, a robot comprising a base member, a moving platform operative as the end effector of the robot, a plurality of adjustable links connecting the base member to the moving platform, the status of each of the adjustable links being known by means of a sensor associated with each of the links, and a single additional sensor connected between the base member and the moving platform. At least one of the adjustable links of the robot may preferably be a linear extensible link, in which case the sensor associated therewith is a length sensor. Alternatively and preferably, at least one of the adjustable links may be an angular rotational hinge, in which case the sensor associated therewith is an angular sensor. In the above mentioned robot, the single additional sensor may preferably be either a length sensor or an angular sensor.

There is further provided in accordance with yet another preferred embodiment of the present invention, a robot as described above, and also comprising a controller which verifies at least one of the position and orientation of the moving platform as determined by the sensors associated with each of the plurality of links, by means of the output of the single additional sensor. The controller then preferably provides an absolute verification of at least one of the position and orientation of the moving platform in the event that any one sensor is providing an erroneous output.

Additionally and preferably, the controller may provide a verification having a statistically insignificant probability of falsehood, of at least one of the position and orientation of the moving platform, in the event that two or more sensors simultaneously provide erroneous outputs. In the latter case, the maximum value of that statistically insignificant probability is the product of the square of the probability that one sensor is providing an erroneous output divided by the number of incremental positions in that one of the sensors having the least resolution.

In accordance with still another preferred embodiment of the present invention, in any of the above-mentioned robots, the plurality of extensible links may preferably be six links, and the single additional sensor a seventh sensor, or the plurality of links may preferably be four links, and the single additional sensor a fifth sensor, or even more generally, the single additional sensor is one sensor more than the number of degrees of freedom of the robot.

There is further provided in accordance with still other preferred embodiments of the present invention, a robot as described above, and wherein the robot is either a parallel robot, or a hybrid series-parallel robot.

In accordance with a further preferred embodiment of the present invention, there is also provided a method of verifying the positional reliability of a robot, comprising the steps of providing a robot comprising a base member, a moving platform operative as the end effector of the robot, and a plurality of adjustable links connecting the base member to the moving platform, the status of each of the adjustable links being known by means of a sensor associated with each of the links, and connecting a single additional sensor between the base member and the moving platform between predetermined points thereon.

There is also provided in accordance with yet a further preferred embodiment of the present invention, the method as described above, and also comprising the step of verifying by means of a controller that at least one of the position and orientation of the moving platform determined by the sensors associated with each of the plurality of links, is consistent with the corresponding relative position or orientation of the predetermined points as determined by the single additional sensor.

In either of the above mentioned methods, at least one of the adjustable links may preferably be a linear extensible link, in which case the sensor associated with the linear extensible link is a length sensor. Alternatively and preferably, at least one of the adjustable links may be an angular rotational hinge, in which case the sensor associated therewith is an angular sensor. In any of the above mentioned methods, the single additional sensor may preferably be either a length sensor or an angular sensor.

In the above described methods involving use of the controller for the verification step, the controller preferably provides an absolute verification of at least one of the position and orientation of the moving platform in the event that any one sensor is providing an erroneous output.

Additionally and preferably, the controller may provide a verification having a statistically insignificant probability of falsehood, of at least one of the position and orientation of the moving platform, in the event that two or more sensors simultaneously provide erroneous outputs. In the latter case, the maximum value of that statistically insignificant probability is the product of the square of the probability that one sensor is providing an erroneous output divided by the number of incremental positions in that one of the sensors having the least resolution In accordance with still another preferred embodiment of the present invention, in any of the above-mentioned methods, the plurality of extensible links may preferably be six links, and the single additional sensor a seventh sensor, or the plurality of links may preferably be four links, and the single additional sensor a fifth sensor, or even more generally, the single additional sensor is one sensor more than the number of degrees of freedom of the robot.

There is further provided in accordance with still other preferred embodiments of the present invention, a method as described above, and wherein the robot is either a parallel robot, or a hybrid series-parallel robot.

BRIEF DESCRIPTION OF THE DRAWINGS

The present invention will be understood and appreciated more fully from the following detailed description, taken in conjunction with the drawings in which:

FIG. 1 shows a schematic illustration of an exemplary prior art parallel robot with six extensible links, and a length sensor on each link;

FIG. 2 illustrates schematically the parallel robot shown in FIG. 1, but adapted according to a preferred embodiment of the present invention, by the addition of one extra sensor attached between the moving platform and the base platform;

DETAILED DESCRIPTION OF PREFERRED EMBODIMENTS

Figure 3:
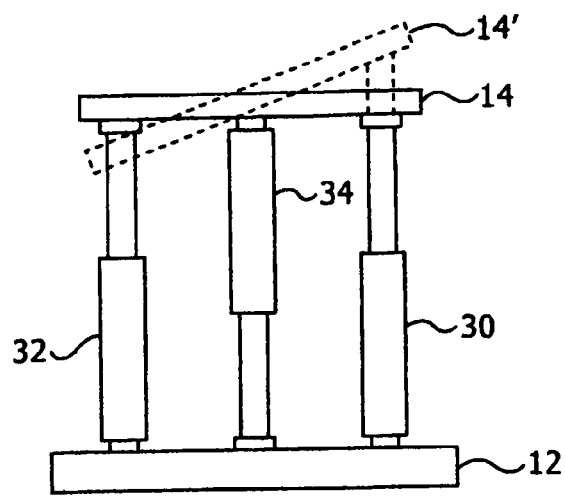
FIG. 3 shows schematically two links and the $7^{th}$ sensor of a six-link parallel robot of the type shown in the embodiment of FIG. 2, in a situation when two sensors provide erroneous output readings.

Reference is now made to FIG. 1, which illustrates schematically a prior art exemplary parallel robot, with six extensible links 10. Each of the six extensible links is connected between the base platform 12 and the moving end-effector platform 14, preferably by means of a spherical joint at one end of the link and a U-joint at the other. In addition, each link length is measured by means of a position or length sensor 16 that moves with the link, and which provides a feedback signal to the robot control system indicating the length of the link, and hence, in combination with the information from the other link sensors, the position and orientation (pose) of the moving platform 14. The prior art methods of ensuring the reliability of the robot position are either to double-up each sensor 16 with a back-up sensor fixed adjacent to the primary sensor on each link, the sole purpose being to provide a one-to-one back-up for each sensor, or, according to the methods described in the above mentioned International Publication No. WO 01/19272, to add three or more sensors connected between the base platform 12 and the moving platform 14. Either of these solutions is expensive in terms of available space and cost.

Reference is now made to FIG. 2, which illustrates schematically the parallel robot shown in FIG. 1, but adapted according to a preferred embodiment of the present invention, by the addition of one extra sensor, the $7^{th}$ sensor, 20, attached between the moving and the base platform, preferably in their central regions, such that it measures the distance between the attachment points on the moving and the base platforms. This extra sensor enables absolute verification of the moving platform location if one sensor fails, and statistically reliable verification of the moving platform if two or more sensors fail.

Changing the lengths of the extensible links generally changes the distance between the platform centers, and this change is detected by the $7^{th}$ sensor. The data from this $7^{th}$ sensor is passed, preferably through a connector in the base to the robot control system 22, together with all of the encoder outputs from the six extensible links, and the data is compared for compatibility. Since the moving platform to which the $7^{th}$ sensor is connected is a rigid body, the length of the $7^{th}$ sensor is uniquely determined by the known length of the six links and hence provides backup information in the case of incorrect platform position. If as a result of a sensor failure, the moving platform is sent to a position other than that defined by the six sensor readings, then the $7^{th}$ sensor will provide an inconsistent readout, and the controller 22 thus provides warning of a sensor failure. Likewise, failure of the redundant $7^{th}$ sensor will cause it to provide a readout inconsistent with the output information provided by the other six sensors. Though a length sensor is a particularly convenient configuration for the $7^{th}$ sensor, and such a length sensor is used to illustrate the various preferred embodiments of the present invention, it is to be understood that the invention is not meant to be limited to use of a length sensor as the additional sensor, and that it is also implementable using an angular sensor as the additional sensor.

There are a number of situations where a single additional sensor will not detect any unwanted platform motion in the event of a link sensor failure. One such situation arises if all of the six link sensors fail and all provide false readings off by amounts such that the moving platform changes its rotational orientation about an axis through its center, while keeping its center fixed, and hence the $7^{th}$ sensor will provide an unchanged and correct length readout.

Similarly, if three of the sensors fail, and the other three fail symmetrically by an equal amount but in the opposite sense, then the moving platform might perform a pure rotation about its diametric axis, which will not be detected by the $7^{th}$ sensor, if the $7^{th}$ sensor is a length sensor, but may be detected if the seventh sensor is an angular sensor, depending on the type of angular sensor.

The use of a $7^{th}$ sensor, according to the preferred embodiments of the present invention, is only a practical back-up system for sensor failure, if it can be shown that the likelihood of the occurrence of combinations of sensor and sensor failures that are not detected by the $7^{th}$ sensor is so low as to be statistically insignificant.

In order to ascertain this likelihood, a number of failure scenarios are now analyzed. Firstly, the case of a single link sensor failure is investigated. In this situation, when the actuator moves, changing its associated link length, the control loop is closed with an erroneous position signal generated by the faulty sensor. The cases in which such an error is not detected by the $7^{th}$ sensor are now analyzed.

In order to identify these problematic cases, the moving platform trajectories that maintain the $7^{th}$ sensor reading constant should be calculated. When this is done, it is determined that there may be some situations in which the robot has one or more points of singularity. Such singular configurations, as they are known in the art, arise either when the robot cannot physically get to a commanded point, in which case the robot is said to have lost one degree of freedom, or when the robot loses control of the moving platform, which can undergo a displacement even while all the actuators maintain their length, in which case the robot is said to have gained one extra degree of freedom. Most practically used robots, including the 6-link parallel robot used to describe this preferred embodiment of the present invention, are designed in such a way that all of the possible singular configurations are outside of the robot work envelope.

However, when one sensor or sensor fails, there are still six known measured distances between the platforms, namely five link-length sensors and the $7^{th}$ sensor. This constitutes a "new" robot where the six link lengths are measured at different locations at the platforms in relation to the locations of the six links in the original robot. If this "new" robot contains singular configurations within the original robot work volume, the moving platform is able to move without being detected by the $7^{th}$ sensor, and the backup system is therefore useless.

If, however, no singular configurations exists within the "new" robot work volume, then any unplanned platform motion generated by an erroneous link-length sensor, is positively detected by the $7^{th}$ sensor. This is true since otherwise, there would be two different distinct solutions for the link lengths for the same position and orientation of the moving platform, as determined up to a single assembly mode by the inverse kinematics from the 5 link-length sensors and the $7^{th}$ sensor. The robot can switch assembly modes only when it passes through a singular configuration, which has been defined above as being out of the working envelope.

In order to determine what the singular configurations of the "new" robot are, it is necessary either to conduct an analytical analysis, such as by one of the methods described, for instance, in the article "Singular configurations of parallel manipulators and Grassmann geometry" by J.-P. Merlet, published in *Int. J. of Robotics Research*, Vol. 8(5), pp. 45-56, October 1989, or in the article "Determination of the presence of singularities in a workspace volume of a parallel manipulator" by J.-P. Merlet, published in "*NATO-ASI, Computational methods in mechanisms*" edited by Sts. Konstantin and Elena Resort, 16-28 Jun., 1997, or in the article "Singularity analysis of closed-loop kinematic chains" by C. Gosselin and J. Angeles, published in IEEE Transactions on Robotics and Automation, Vol. 6, No. 3, June 1990, or in the Ph.D. Thesis on "Design Parameters of Parallel Manipulators" by R. Ben-Horin, The Technion, Israel, 1998, or alternatively, to conduct a search of the entire workspace of the manipulator.

If it is found that such singular configurations do not exist within the robot workspace, it can be concluded that there is no possible motion of the robot that can go undetected by the $7^{th}$ sensor if only one sensor fails.

The situation is now considered in which two sensors or sensors fail simultaneously. The likelihood of such an occurrence is very low. Moreover, even if two sensors fail at the same time and give erroneous readings, this is also detected by the $7^{th}$ sensor, unless the values given by the two failed sensors are in such a proportion that they just happen to match a valid displacement of the moving platform as determined by the other sensors and the $7^{th}$ sensor.

This situation is illustrated schematically in FIG. 3, which shows two links 30, 32, and the $7^{th}$ sensor 34 of a six-link parallel robot of the type shown in the embodiment of FIG. 2. The "correct" position of the moving platform 14 is shown as a full line. Due to the incorrect output reading of the sensor of the right hand link 30, the control system is provided with a signal from this sensor that makes the control system believe that the moving platform is in the tilted position 14', as indicated by the dotted lines, while the $7^{th}$ sensor 34 outputs correctly that its length has not changed, as the moving platform has performed a tilt about the point of attachment of the $7^{th}$ sensor. However, such an incorrect position of the moving platform would be detected by the sensor of the left hand link 32, since its position would be inconsistent with the output of the left hand link sensor, which expects to detect the platform in the dotted position 14', but actually finds it in the "correct" full line position 14. The failure of the right hand link sensor is thus detected, unless the sensor of the left hand link 32 also fails, and in such a manner that it outputs a reading which exactly simulates that which would be obtained from the moving platform in its apparently tilted dotted position 14'.

In particular, when the location of the moving platform is defined by only 5 distance readings (4 link-lengths and the $7^{th}$ sensor), then it is not fully defined and the platform might move freely and have an infinite number of locations. Now whatever the reading of one failed sensor, it incorrectly defines the position of the moving platform, since the situation is effectively the same as the previous case with only one failed sensor. Whatever the first failing sensor reading is, there are now six other readings, the five correctly reading sensors and the seventh one. This uniquely determines the location of the platform (up to assembly mode) and hence we are at the same point as the analysis of one sensor failing, and can continue from that point by noting that for one sensor failing there is no way it can go undetected. This means that there is only one combination within the current assembly mode, of the two failed sensors that match the remaining five correctly operating sensors.

Based on the above analysis, the probability that the platform undergoes a movement without being detected by the $7^{th}$ sensor when either one or two sensors fail simultaneously may be calculated by the following procedure:

(i) It should be ensured that there are no singular points of operation within the entire robot workspace, in a robot composed of 5 link-length sensors and the $7^{th}$ sensor.
(ii) If this is confirmed, the probability that one sensor may fail is determined.
(iii) The probability that two sensors fail simultaneously is then the square of the probability that one may fail.
(iv) The probability that two sensors fail simultaneously and give a valid reading is the square of the probability of one failing times the reciprocal of the number of increments in one sensor, since there is a probability of one out of that number of increments that the incorrect failed reading will, by chance, be equal to the expected "correct" reading. The above calculation applies when all of the sensors have the same resolution, i.e. number of increments. If different sensors of the robot have different resolutions, then the highest probability of obtaining a valid reading when two sensors fail simultaneously, is given by the square of the probability of one failing times the reciprocal of the number of increments in the sensor with the lowest resolution.

In order to provide an estimate of the order of such a probability, an exemplary calculation is made for the SpineAssist miniature surgical robot, supplied by Mazor Surgical Technology Ltd., of Caesarea, Israel. For this robot, the encoder/sensor life time is given as 10,000 hours. The probability of one encoder/sensor failing during an operation that lasts for one hour is thus $10^{-4}$. The sensor resolution is 12 bit, i.e. 4096 incremental steps. Hence the probability, p, that an incorrect motion remains undetected by the $7^{th}$ sensor, as a result of two failed sensors is given by:

$$p=10^{-4} \times 10^{-4} \times 4096^{-1}=2.44 \times 10^{-12}$$

The planned lifetime of each robot is 500 hours; hence the probability of an undetected platform motion arising from the simultaneous failure of two sensors, during the entire robot lifetime is $p=1.22 \times 10^{-9}$.

The above calculation is based on the expected lifetime of the encoder/sensors only. Taking into consideration that the encoder/sensor reading is also affected by other factors, such as the A/D converter, the encoder card and the power supply, the probability for a single sensor error reading during a one hour surgical procedure might be reduced by as much as an order of magnitude, to $10^{-3}$. Hence the probability for an incorrect motion remaining undetected by the $7^{th}$ sensor due to two failed sensors is then given as:

$$p=10^{-3} \times 10^{-3} \times 4096^{-1}=2.44 \times 10^{-10}$$

During the robot lifetime of 500 hours, the probability is $p=1.22 \times 10^{-7}$. Noting that during these 500 hours, 500 surgical procedures will be performed by the robot, the probability of such an undetected failure in a single operation is $2.44 \times 10^{-10}$. This is equivalent to the probability that if the robot is used for performing such a one hour surgical procedure on every one of the earth's current population, then using the $7^{th}$ sensor back-up system of the present invention, only one undetected failure arising from a double sensor failure will be statistically expected.

The probability that three or more sensors fail without being detected by the use of the $7^{th}$ sensor, is, of course, even smaller than the probability that two sensors fail without this being detected.

Figure 4:
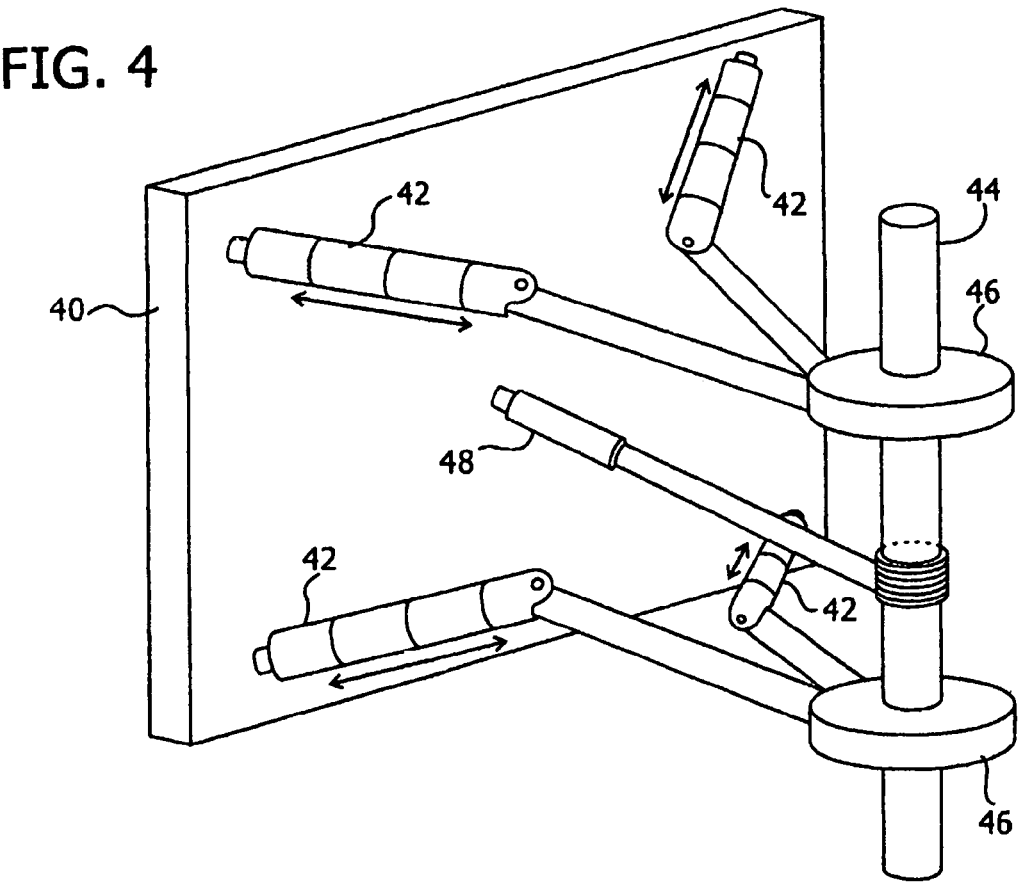
FIG. 4 illustrates schematically the application of the methods of the present invention to a further preferred type of parallel robot with four extensible links, and having one extra sensor attached between the base member and the end effector.

Reference is now made to FIG. 4, which illustrates schematically the application of the methods of the present invention to a further preferred type of parallel robot, similar to that described in U.S. Pat. No. 6,837,892 for "Miniature Bone-mounted Surgical Robot" to the inventor of the present application. The parallel robot shown in FIG. 4 has a base member 40, to which are flexibly connected four extensible links 42, each with their own length sensor installed, and which provide controlled motion to the end effector, which is preferably shown in FIG. 4 as a guide tube 44 supported by two ring joints 46 whose position is moved by extension of the links 42. A tool can be inserted through the guide tube 44 and maneuvered to the desired position. A fifth sensor 48 is attached between a known point on the base member 40 and a known point on the end effector 46, and the output of this $5^{th}$ sensor is utilized, in the same way as is described hereinabove with respect to the $7^{th}$ sensor in the six-link robot of FIG. 2, to provide back-up information to verify the position of the end effector provided by the four extensible link sensors.

Figure 5:
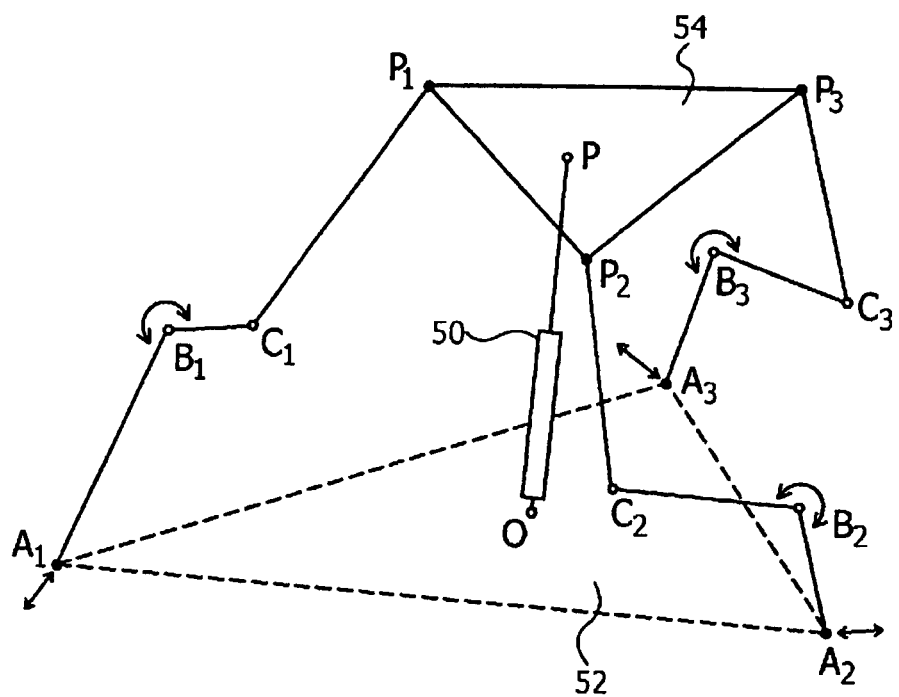
FIG. 5 is a perspective view of the kinematic configuration of a further robot type, having a hybrid series-parallel configuration, showing the application of the methods of the present invention to such a robot.

Reference is now made to FIG. 5, which is a perspective view of the kinematic configuration of a further robot type, having a hybrid series-parallel configuration. FIG. 5 illustrates schematically the application of the methods of the present invention to such a hybrid robot configuration. The robot is similar in mechanical structure to that described in the article entitled "Kinematic Structure of a Parallel Robot for MEMS Fabrication" by H. Bamberger and the inventor of the present application, and published in Advances in Robot Kinematics, ARK, Italy, 2004, and which has three linear motors, and also to that described in a paper by the same authors entitled "A New Configuration of a Six Degrees-of-Freedom Parallel Robot for MEMS Fabrication" presented at the IEEE International Conference on Robotics and Automation, (ICRA 2004), New Orleans, La., USA, and which has six linear motors. However, the preferred robot configuration shown in FIG. 5 differs from the first above-mentioned robot in that, besides the three linear motors located at the base of the robot, it also comprises an angular actuator in each of its jointed arms, such that the moving platform is endowed with a total of six degrees of freedom.

In the preferred embodiment of FIG. 5, the fixed robot base 52, is connected to the moving platform 54, by means of three articulated legs. Each leg preferably has three arms, each arm including one linear motor and one rotational motor. Thus, leg A1, B1, C1, P1, is attached to the base at point A1, which is moved in the plane of the base by means of a linear motor, has an angular rotational motor, preferably at revolute hinge B1, a passive revolute hinge at C1, and is connected to the moving platform 54 at point P1. Such a robotic structure is not a pure parallel configuration, because of the action of the additional links and joints connected in each loop, whose effect is serial to the motion imparted to each leg by the linear motors at the base. In such a hybrid configuration, the combination of the sensors on the parallel linear motors and on the serial angular actuators together define a unique position of the moving platform end effector. According to this preferred embodiment of the present invention, the robot shown in FIG. 5 includes an additional redundant sensor 50, connected between a point O in the central region of the base, and a point P on the central region of the moving platform. This $7^{th}$ sensor is operative to provide verification information about the expected moving platform position. Failure of one or more motor encoders/sensors, whether linear or rotational, will be detected by the additional redundant sensor, in a similar manner to that described above for the pure parallel robot configurations.

It is to be understood that the robotic configuration shown in FIG. 5 is only one preferred embodiment of a hybrid robot to which the methods of the present invention can be successfully applied, and other hybrid robot configurations can also use a single redundant sensor to detect sensor failure. One common preferred configuration of such a different type could have a linear motor as the serial actuator within the link, rather than the angular actuator in the preferred embodiment shown in FIG. 5.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A robot comprising:
    a base member;
    a moving platform operative as the end effector of the robot;
    a plurality of adjustable links connecting said base member to said moving platform, the status of each of said plurality of adjustable links being known by means of a sensor associated with each of said plurality of links, the combined outputs of said plurality of sensors indicating the pose of said platform; and
    a single additional sensor not associated with any single one of said links, connected between said base member and said moving platform,
    wherein said single additional sensor provides an indication of an erroneous output in the reading of any one of said plurality of sensors.

2. A robot according to claim 1 and wherein at least one of said adjustable links is a linear extensible link and said sensor associated with said linear extensible link is a length sensor.

3. A robot according to claim 1 and wherein at least one of said adjustable links is an angular rotational hinge, and said sensor associated with said angular rotational hinge is an angular sensor.

4. A robot according to claim 1 and wherein said single additional sensor is any one of a length sensor and an angular sensor.

5. A robot according to claim 1 and also comprising a controller which verifies at least one of the position and orientation of said moving platform as determined by the sensors associated with each of said plurality of links, by means of the output of said single additional sensor.

6. A robot according to claim 5 and wherein said controller provides an absolute verification of at least one of the position and orientation of said moving platform in the event that any one sensor is providing an erroneous output.

7. A robot according to claim 1 and wherein said plurality of extensible links is six links, and said single additional sensor is a seventh sensor.

8. A robot according to claim 1 and wherein said plurality of links is four links, and said single additional sensor is a fifth sensor.

9. A robot according to claim 1 and wherein said robot is either of a parallel robot and a hybrid series-parallel robot.

10. A method of using a robot, comprising the steps of:
    providing a robot comprising a base member, a moving platform operative as the end effector of the robot, and a plurality of adjustable links connecting said base member to said moving platform, the status of each of said adjustable links being known by means of a sensor associated with each of said links, and the combined outputs of said plurality of sensors indicating the pose of said platform;
    connecting a single additional sensor not associated with any single one of said links, between said base member and said moving platform between known points thereon; and
    using information from said single additional sensor to provide an indication of an erroneous output in the reading of any one of said plurality of sensors.

11. A method according to claim 10 and wherein said step of using information comprises verifying that at least one of the position and orientation of said moving platform determined by the sensors associated with each of said plurality of links, is consistent with at least one of the corresponding relative position and orientation of said known points, as determined by said single additional sensor.

12. A method according to claim 10 and wherein at least one of said adjustable links is a linear extensible link, and said sensor associated with said linear extensible link is a length sensor.

13. A method according to claim 10 and wherein at least one of said adjustable links is an angular rotational hinge, and said sensor associated with said angular rotational hinge is an angular sensor.

14. A method according to claim 10 and wherein said single additional sensor is any one of a length sensor and an angular sensor.

15. A method according to claim 10 and wherein said information further provides an absolute verification of at least one of the position and orientation of said moving platform in the event that any one sensor is providing an erroneous output.

16. A method according to claim 10 and wherein said plurality of extensible links is six links, and said single additional sensor is a seventh sensor.

17. A method according to claim 10 and wherein said plurality of links is four links, and said single additional sensor is a fifth sensor.

18. A method according to claim 10 and wherein said robot is either of a parallel robot and a hybrid series-parallel robot.

19. A robot according to claim 1, wherein said sensors have a rated lifetime T, such that the probability of failure of any one of said sensors during a procedure lasting a length of time t is given by t/T, and wherein if said sensors have at least N increments, the probability P that an incorrect motion arising from the simultaneous failure of two of said sensors would remain undetected by said single additional sensor, is given by the equation $P=(1/N) \cdot (t/T)2$.

20. A robot according to claim 19, and wherein said sensors have a reliability such that said probability P is less than the probability of failure allowable by an accepted safety requirement for the procedure performed by the robot, such that the probability that two sensors or more fail simultaneously in a mode that makes said failures undetectable is statistically insignificant in relation to said safety requirement for the procedure performed by the robot.

21. A robot according to claim 20, wherein the use of information from said single additional sensor provides a statistically acceptable indication of an erroneous output in the reading of said two or more of said sensors.

22. A method according to claim 10, wherein said sensors have a rated lifetime T, such that the probability of failure of any one of said sensors during a procedure lasting a length of time t is given by t/T, and wherein if said sensors have at least N increments, the probability P that an incorrect motion arising from the simultaneous failure of two of said sensors would remain undetected by said single additional sensor, is given by the equation $P=(1/N) \cdot (t/T)2$.

23. A method according to claim 22, and wherein said sensors have a reliability such that said probability P is less than the probability of failure allowable by an accepted safety requirement for the procedure performed by the robot, such that the probability that two sensors or more fail simultaneously in a mode that makes said failures undetectable is statistically insignificant in relation to said safety requirement for the procedure performed by the robot.

24. A method according to claim 23, wherein the use of information from said single additional sensor provides a statistically acceptable indication of an erroneous output in the reading of said two or more of said sensors.

* * * * *